Figure 1:
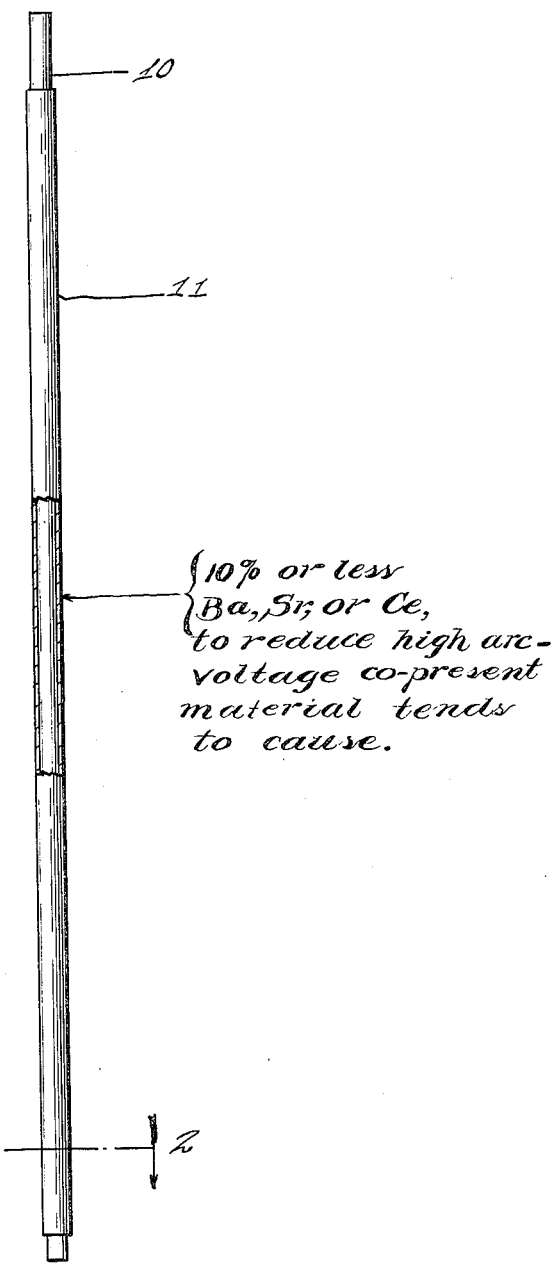

Oct. 16, 1934.  P. R. JUDY  1,977,278
COATED ELECTRODE FOR ELECTRIC WELDING
Filed July 1, 1933

10% or less Ba, Sr, or Ce, to reduce high arc-voltage co-present material tends to cause.

Inventor
PAUL R. JUDY,
By Schley & Trask
Attorneys

Patented Oct. 16, 1934

1,977,278

UNITED STATES PATENT OFFICE 1,977,278

COATED ELECTRODE FOR ELECTRIC WELDING

Paul R. Judy, Muncie, Ind., assignor to Indiana Steel & Wire Company, Muncie, Ind., a corporation of Indiana Application July 1, 1933, Serial No. 678,616

4 Claims. (Cl. 219—8)

It is the object of my invention to stabilize the arcs produced in electric welding in the presence of certain fluxes, usually supplied as coatings on the electrodes, which tend to produce an undesirably high voltage across the arc; and to make possible or more available the use, as in electrode coatings, of certain desirable fluxes which are otherwise impracticable or of limited availability.

In arc welding, the flux may be supplied either separately or as a coating on the electrode—desirably the latter in most cases.

Many fluxes for arc welding have been developed. Some of them give excellent results. However, with some fluxes which are desirable for various reasons the voltage across the arc which the electrode produces tends to be high, and sometimes to be so high that the flux is rendered wholly impracticable, or practicable merely for certain limited uses. Among the difficulties which arise in using such fluxes are the following:

1. A tendency of the metal to sag in vertical welding, thus producing a thin elongated bead.
2. Relative instability of the arc, causing erratic behavior and often resulting in extinguishing the arc.
3. A sensitivity to variations in current, with the result that there are certain critical current values, and that effective operation requires a fairly constant current setting.
4. A tendency of the electrodes to stick to the work, especially when a close arc-length is held.
5. A tendency to undercut at the edges of the bead, especially in vertical welding.
6. A tendency to form adherent scale, which is not only hard to remove but which interferes with the deposition of subsequent layers of welding material.
7. A tendency for the flux, if in a coating, to melt ahead of the arcing end of the electrode, so that the molten flux runs down over the end of the electrode and distorts the arc characteristics, resulting in erratic behavior of the arc and a poor weld.
8. General difficulty in vertical welding, and even greater difficulty in overhead welding.

I have discovered that it is possible to lower the voltage across the arc produced in the presence of fluxes which tend to produce high arc-voltages, and to avoid some and often all of these difficulties which are sometimes encountered, by adding to the flux a relatively small amount of barium, strontium, and/or cerium. These are desirably in the form of their compounds, such as the oxide or the carbonate; although they can be added as metals, or as metallic alloys. These metals have a peculiar action as stabilizers or co-ordinators; apparently not shared by metals which are commonly classed with them, such as calcium or silicon. Indeed, by using strontium, barium, and/or cerium I can stabilize welding-electrode arcs even when the presence of calcium and/or silicon in the coating tends to make the arc-voltage undesirably high.

I think this action of lowering the arc-voltage is due largely to the fact that the ionizing potentials of strontium, barium, and cerium are all relatively low, in comparison not only with those of elements such as calcium and silicon in the same chemical groups but also in comparison with those of certain other elements, such as iron, aluminum, magnesium, manganese, titanium, boron, and a number of others. I think other advantages are also due to the fact that the melting points of the oxides of strontium, barium, and cerium are all relatively high; for in the welding operation those oxides are probably formed in the arc temperature in the presence of atmospheric oxygen.

Fluxes with which compounds of strontium, barium, and/or cerium have been used to lower the arc-voltage in comparison to what it would be without them are the following.

1. Calcium carbonate.
2. Iron carbonate.
3. Magnesium carbonate.
4. Manganese carbonate.
5. Magnesium oxide.
6. Manganese oxide.
7. Iron oxide.
8. Aluminum oxide.
9. Titanium dioxide.
10. Silicon dioxide.
11. Iron titanate.
12. Kaolin.
13. Talc.
14. Ground glass.
15. Various earth silicates using potassium and/or sodium silicate as a binder.

These fluxes have been used as coating materials, for the electrodes; and in most instances were held in place by suitable binders, such as sodium or potassium silicate, or lacquers, gums, or resins. Sometimes the coatings contained only one of the substances named, and sometimes they contained a plurality of them in various mixtures.

With any of those compounds as the flux—in the coating of coated electrodes—there is a tendency for the arc voltage to be high—often higher than is desirable, and sometimes so high that the flux is rendered incapable of practicable use.

However, by the addition to the flux of a small amount of barium, strontium, and/or cerium, the arc-voltage may be lowered to a value which makes it highly suitable, not only for "down-hand" welding but also for vertical welding and for overhead welding.

Figure 2:
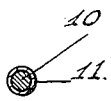

The accompanying drawing shows a welding electrode coated in accordance with my invention: Fig. 1 is an elevation of such a coated welding electrode, partially broken away to show the electrode in longitudinal section; and Fig. 2 is a cross-section of such electrode on the line 2—2 of Fig. 1.

As such drawing shows, a metallic wire or rod 10 which forms the core of the electrode is covered for all or the greater part of its length by a coating 11; which contains barium, strontium, and/or cerium, as voltage-lowering ingredients, in addition to material which tends to produce a relatively high arc-voltage.

The flux, desirably present as the coating 11 but applicable separately if desired, contains material which tends to produce a relatively high arc-voltage; but in addition thereto contains a relatively small amount, not exceeding 10%, of barium, strontium, and/or cerium, or of some compound or allow thereof, to counteract the tendency to produce a high arc-voltage and thus to lower the arc-voltage to a point where the electrode may be used with greater facility, and desirably sufficiently low so that the electrode may be used for welding in any position, whether "down-hand", vertical, or overhead.

The main part of the flux, or coating, may be of any desired character, even though in the absence of barium or strontium or cerium the arc-voltage would tend to be undesirably or impracticably high. Among such fluxes may be those which contain one or more of the compounds listed earlier in this specification. But if in addition to those materials I include barium and/or strontium and/or cerium, as contemplated by this invention, I am able to reduce that arc-voltage to a desirable value.

I claim as my invention:

1. A coated welding electrode of which the coating contains (a) material which tends to cause the arc-voltage to be higher than desired when the electrode is used for welding, and (b) not to exceed 10% of a metal of the class consisting of barium, strontium, and cerium.

2. A coated welding electrode of which the coating contains (a) material which tends to cause the arc-voltage to be higher than desired when the electrode is used for welding, and (b) not to exceed 10% of barium.

3. A coated welding electrode of which the coating contains (a) material which tends to cause the arc-voltage to be higher than desired when the electrode is used for welding, and (b) not to exceed 10% of strontium.

4. A coated welding electrode of which the coating contains (a) material which tends to cause the arc-voltage to be higher than desired when the electrode is used for welding, and (b) not to exceed 10% of cerium.

PAUL R. JUDY.